United States Patent Office 3,839,347
Patented Oct. 1, 1974

3,839,347
1-AMINOBENZIMIDAZOLES
Michael H. Fisher and Bruce O. Linn, Somerville, and Richard J. Bochis, East Brunswick, N.J., and Clarence Stanley Rooney, Beaconsfield, Quebec, Canada, assignors to Merck & Co., Inc., Rahway, N.J.
No Drawing. Filed Jan. 7, 1972, Ser. No. 216,259
Int. Cl. C07d 99/10
U.S. Cl. 260—302 H      13 Claims

ABSTRACT OF THE DISCLOSURE

Benzimidazoles characterized by having at the 1-position an amino or substituted amino substituent are employed as anthelmintic agents and as fungicides.

---

This invention relates to novel compositions of matter classifiable in the field of organic chemistry as substituted benzimidazoles. More particularly, this invention relates to substituted benzimidazoles characterized by having an amino or substituted amino substituent at the 1-position; to methods for preparing such compounds; and to methods of employing such compounds as anthelmintic agents and as fungicides.

In its composition aspect, therefore, the instant invention may be described as residing in the concept of benzimidazoles of the formula:

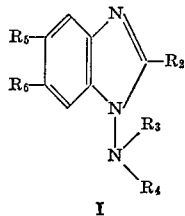

I wherein $R_2$ is a member selected from the group consisting of aryl, orthohaloaryl, a heteroaromatic radical containing from 1 to 3 hetero atoms selected from the group consisting of nitrogen, oxygen and sulfur, and

wherein $R_1$ is a member selected from the group consisting of the loweralkyl, loweralkoxy, cyclolower-alkyl, cycloloweralkoxy, aryl, aryloxy, amino, loweralkylamino, diloweralkylamino, anilino, pyrrolidino, piperidino, morpholino, piperazino and a heteroaromatic radical containing from 1 to 3 hetero atoms selected from the group consisting of nitrogen, oxygen and sulfur, and wherein X is a member of the group consisting of oxygen and sulfur $R_5$ and $R_6$ are members selected from the group consisting of hydrogen, halogen, lower alkyl, loweralkoxy, loweralkylthio, phenyl, halophenyl, phenoxy, phenylthio, amino, loweralkylamino, diloweralkylamino and

wherein $R_1$ and X are as defined above, provided that that when $R_5$ and $R_6$ are other than halogen at least one of $R_5$ and $R_6$ is hydrogen; and $R_3$ and $R_4$ are members selected from the group consisting of hydrogen, loweralkyl, loweralkanoyl, carboxyloweralkanoyl and benzyl, provided that only one of $R_3$ and $R_4$ is loweralkanoyl, or carboxyloweralkanoyl, and when taken together, $R_3$ and $R_4$ are

wherein $R_7$ and $R_8$ are members selected from the group consisting of hydrogen, loweralkyl, phenyl, carboxy, carboxyloweralkyl and loweralkanoyl, provided that only one of $R_7$ and $R_8$ is hydrogen or loweralkanoyl;

and the pharmaceutically acceptable acid addition salts thereof and the pharmaceutically acceptable alkali metal, alkaline earth metal and amine salts thereof when either or both of $R_7$ and $R_8$ are carboxy.

As used above in defining the symbols $R_1$ to $R_8$, the terms, aryl and aryloxy are intended to include aryl and aryloxy radicals such as phenyl, naphthyl, phenoxy and naphthyloxy. The terms, loweralkyl, loweralkylthio and loweralkoxy, are intended to include straight and branched chain alkyl, alkylthio and alkoxy groups containing from 1 to 6 carbon atoms in the alkyl, alkylthio or alkoxy moiety such as, for example, methyl, ethyl, isopropyl, hexyl, propylthio, butylthio, pentylthio, methoxy, ethoxy, isopropoxy, hexyloxy and the like. The terms, cycloloweralkyl and cycloloweralkoxy, are intended to include cycloalkyl and cycloalkoxy groups having from 4 to 8 carbon atoms such as, for example, cyclobutyl, cyclohexyl, cyclopentoxy, cycloheptyloxy, cyclooctyloxy and the like. The terms, loweralkanoyl, and carboxyloweralkanoyl are intended to include straight and branched chain alkanoyl and carboxyalkanoyl groups having from 1 to 6 carbon atoms such as, for example, acetyl, manonoyl, trifluoroacetyl, propionyl, butyryl, succinoyl and the like. The terms, halo and halogen, are intended to include halogens such as fluorine, chlorine, bromine and iodine. The terms, alkali metal salt and alkaline earth metal salt, are intended to include salts of alkali metals and alkaline earth metals such as, for example, lithium, sodium, potassium, cesium, calcium, magnesium, barium and strontium. Pharmaceutically acceptable amine salts will include those derived from amines such as ammonia, ethanolamine, diethanolamine, guanidine, arginine, lysine, ethylenediamine, piperazine, and morpholine. Pharmaceutically acceptable acid salts will include those derived from inorganic and organic acids such as hydrochloric acid, lactic acid, caproic acid, aspartic acid, glutamic acid, citric acid and tartaric acid. Finally the term, heteromatic radical, as used above, is intended to include heteroaromatic radicals containing one hetero atom in the ring structure such as thienyl, furyl, pyrryl; pyridyl, coumarinyl and thiocoumarinyl; heteroaromatic radicals containing two hetero atoms in the ring structure such as thiazolyl, isothiazolyl, pyrazolyl, oxazolyl and imidazolyl; and heteroaromatic radicals containing three hetero atoms in the ring structure such as thiadiazolyl.

The instant invention is based upon applicants' discovery that the 1-amino benzimidazoles described above show inherent applied use characteristics as anthelmintic agents and as fungicides. The physiological activity of the benzimidazoles of this invention has been confirmed by standard laboratory techniques. Moreover, it has been found that the benzimidazoles of this invention display markedly enhanced water and/or lipid solubility as compared to the parent 1-desamino benzimidazole and are highly useful where liquid formulations are desired or where water and/or lipid solubility is important to delivery of the active agent. It is contemplated that formulations containing the benzimidazoles of this invention as essential active ingredients will be employed in the treatment and control of helminthasis and as fungicides.

The 1-amino benzimidazoles of this invention, i.e. those benzimidazoles described above wherein $R_3$ and $R_4$ are hydrogen, may be prepared readily by direct ammination of the parent 1-desamino benzimidazole. Conveniently, the ammination is carried out by treating a solution or suspension of a 1-desamino benzimidazole starting material, which may be unsubstituted or which may bear any of the $R_2$, $R_5$ and $R_6$ substituents as described above, in a suitable organic solvent, such as methanol, ethanol, hexane, acetone, dimethylsulfoxide, dimethylformamide and the like, with an aminating agent such as hydroxylamine-O-sulfonic acid or chloramine in the presence of a base such as alkali metal or alkaline earth metal hydroxides, alkoxides or carbonates. The reaction can be conducted at room temperature or, if desired, the reaction mixture can be allowed to warm slightly to a temperature of about 50° C. Reaction is usually complete in 24 to 72 hours and the 1-amino benzimidazole product may be separated by filtration after dilution of the reaction mixture with ice water. The product may be purified by recrystallization employing conventional techniques. It will be recognized that the starting benzimidazoles of this are well-known compounds and are either available commercially or may be readily prepared by techniques already fully described in the chemical literature.

Where the starting benzimidazole employed in the reaction described above is unsubstituted or is identically substituted in positions 5 and 6, the introduction of the amino group at the 1-position does not destroy the symmetry of the molecule and the corresponding 1-amino benzimidazole is obtained as a single product. It will be understood by those skilled in the art that where the starting benzimidazole is substituted in the 5- or 6-position, or not identically substituted in the 5- and 6-positions, introduction of the amino group at the 1-position destroys the symmetry of the benzimidazole nucleus so that the product of the reaction is obtained as a mixture of isomers. Thus, for example, when a benzimidazole such as 5-isopropoxycarbonylamino - 2 - (4'-thiazolyl)benzimidazole is subjected to amination by the technique described above, the product is obtained as a mixture of 1-amino-5-isopropoxycarbonylamino - 2 - (4'-thiazolyl)benzimidazole and 1-amino-6-isopropoxycarbonylamino-2-(4'-thiazolyl)benzimidazole. The individual isomers can be separated from the mixture by conventional chromatographic techniques or by conventional fractional crystallization.

The 1-amino benzimidazoles are prepared by the process described above, in addition to their utility as anthelmintic agents and as fungicides serve as convenient intermediates for all of the 1-substituted amino benzimidazoles of this invention. It will be understood that the starting 1-amino benzimidazoles employed in the processes which will be described below may be otherwise unsubstituted or may bear any of the $R_2$, $R_5$ and $R_6$ substituents as described heretofore.

In order to prepare the 1-substituted amino benzimidazoles of this invention wherein the $R_3$ and/or $R_4$ substituents are loweralkyl or benzyl, a solution or suspension of any desired 1-amino benzimidazole starting material in a suitable organic solvent, such as methanol, ethanol, acetone, hexane, benzene or the like, may be treated with a loweralkyl or benzyl halide (i.e. chloride, iodide or bromide) in the presence of a base such as alkaline earth or alkaline earth metal hydroxides, alkoxides or carbonates. The reaction mixture usually is stirred at room temperature for 24 to 96 hours and the product is recovered by evaporation of the solvent. The crude product residue may be purified by conventional recrystallization. Where one mole of loweralkyl or benzyl halide is used per mole of 1-amino benzimidazole starting material, the product obtained is the corresponding 1-monoloweralkylamino (or 1-monobenzylamino) benzimidazole. Use of two moles of loweralkyl or benzyl halide per mole of 1-amino benzimidazole starting material yields the corresponding 1-diloweralkylamino (or 1-dibenzylamino) benzimidazole. Alternatively, 1-diloweralkylamino (or 1-dibenzylamino) benzimidazoles may be prepared by treating a 1-monoloweralkylamino (or 1-monobenzyl) benzimidazole according to the technique described above with an additional mole of loweralkyl or benzyl halide. Obviously, this technique must be employed to prepare compounds wherein the $R_3$ and $R_4$ substituents differ.

The 1-substituted amino benzimidazoles of this invention wherein the $R_3$ or $R_4$ substituent is loweralkanoyl or carboxyloweralkanoyl, may be prepared by treating a suspension or solution of any desired 1-amino benzimidazole starting material in a suitable organic solvent, such as methanol, ethanol, benzene, pyridine, methylene chloride and the like, with a loweralkanoyl halide (i.e. iodide, bromide and chloride) or anhydride, such as anhydrides of mesoxylic, glutaric, succinic or suberic acids and the like. The reaction mixture usually is stirred at room temperature for 2 to 72 hours and the product then precipitated from the reacted mixture by the addition of ice water. After separating the crude product by filtration, purification can be achieved by conventional recrystallization. Where the anhydrides of dicarboxylic loweralkanoic acids are employed as the reactant, the $R_3$ or $R_4$ substituent will be carboxyloweralkanoyl.

Those compounds of the instant invention wherein the substituents $R_3$ and $R_4$ are taken together to form the structure

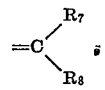

in general may be prepared by treating any desired 1-amino benzimidazole starting material in a suitable organic solvent, including, for example, alkanols, such as methanol, ethanol and isopropanol, and hydrocarbons such as benzene, toluene, hexane and the like, with an aldehyde or ketone. The nature of the $R_7$ and/or $R_8$ substituent obtained, of course, will depend entirely upon the nature of the aldehyde or ketone selected as the reagent.

Thus, for example, those compounds of this invention where $R_7$ or $R_8$ (but not both) are loweralkyl or phenyl are prepared by treating the starting 1-amino benzimidazole with a loweralkyl aldehyde, such as acetaldehyde, propionyl aldehyde, n-butyraldehyde, isobutyraldehyde, n-valeraldehyde, n-caproaldehyde and the like, or with benzylaldehyde. Typical benzimidazoles prepared with such aldehydes as the reagent will include, for example, any of those benzimidazoles as described in Formula I above wherein the substituent at the 1-position

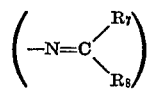

is illustrated in the following table:

TABLE I

| Reagent | 1-substituent $\left(-N=C\diagup^{R_7}_{\diagdown R_8}\right)$ |
|---|---|
| Acetaldehyde | 1-ethylideneamino- |
| Propionaldehyde | 1-propylideneamino- |
| n-Butyraldehyde | 1-butyrylideneamino- |
| iso-Butyraldehyde | 1-isobutyrylideneamino- |
| n-Valeraldehyde | 1-valerylideneamino- |
| n-Caproaldehyde | 1-caproylideneamino- |
| Benzaldehyde | 1-benzylideneamino- |

Where it is desried to prepared compounds wherein both $R_7$ and $R_8$ are loweralkyl or phenyl, it is necessary merely to substitute for the aldehyde reagent employed above an appropriate loweralkanone, such as acetone, diethyl ketone, ethyl methyl ketone, methyl n-propyl ketone, 2-hexanone, 3-hexanone, acetophenone, propiophenone and the like, or benzophenone. Typical benzimidazoles prepared with such ketones as the reagent will include, for example, any of those benzimidazoles as described in Formula I above wherein the substituent at the 1-position

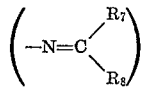

is illustrated in the following table:

TABLE II

| Reagents | 1-substituent $\left(-N=C\diagup{}^{R_7}_{R_8}\right)$ |
|---|---|
| Acetone | 1-dimethylmethyleneamino-1-isopropylideneamino- |
| Diethyl ketone | 1-diethylmethyleneamino- |
| Ethyl methyl ketone | 1-ethylmethylmethyleneamino- |
| Methyl n-propyl ketone | 1-methylpropylmethyleneamino- |
| 2-hexanone | 1-methylbutylmethyleneamino- |
| Acetophenone | 1-methylphenylmethyleneamino- |
| Propiophenone | 1-ethylphenylmethyleneamino- |
| Benzophenone | 1-[bis(phenyl)methyleneamino]- |
| 3-hexanone | 1-ethylpropylmethyleneamino- |

Those benzimidazoles of this invention wherein either or both of $R_7$ or $R_8$ are carboxy or carboxyloweralkyl may be prepared by treating the starting 1-amino benzimidazole with a keto mono- or dicarboxylic loweralkanoic acid. Thus, for example, compounds wherein either $R_7$ or $R_8$ is carboxy, the other being hydrogen, may be prepared by treating the starting 1-amino benzimidazole with glyoxylic acid. Similarly, compounds wherein either $R_7$ or $R_8$ is carboxy or carboxyloweralkyl, the other being hydrogen or loweralkyl, may be prepared by substituting for glyoxylic acid another suitable keto monocarboxylic loweralkanoic acid. Where the carbonyl group of the keto acid is in the α-position, either $R_7$ or $R_8$ will be carboxy and the other will be loweralkyl; where the carbonyl group is in other than the α-position and is not on the terminal carbon atom, either $R_7$ or $R_8$ will be carboxyloweralkyl and the other will be loweralkyl; where the carbonyl group is on terminal carbon atom, either $R_7$ or $R_8$ will be carboxyloweralkyl and the other will be hydrogen. Typical keto acids which may be used for preparing the compounds described above will include, for example, α-keto propionic acid, α-ketobutyric acid, α-ketovaleric acid, α-ketocaprylic acid, 3-ketobutyric acid, 3-ketovaleric acid, 4-ketovaleric acid, formylacetic acid, 3-formylpropionic acid and the like. Benzimidazoles of this invention wherein both $R_7$ and $R_8$ are carboxy or carboxyloweralkyl may be prepared by employing, in place of the keto monocarboxylic acids described above, a keto dicarboxylic loweralkanoic acid, such as, for example, mesoxalic acid (ketomalonic acid), ketosuccinic acid, 2-ketoglutaric acid, 3-ketoglutaric acid, 3-ketoadipic acid, 4-ketopimilic acid, 4-ketosuberic acid and the like. Typical benzimidazoles prepared by employing such keto acids as the reagent will include, for example, any of those benzimidazoles as described in Formula I above wherein the substituent at the 1-position

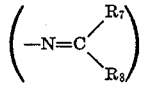

is illustrated in the following table:

TABLE III

| Reagent | 1-substituent $\left(-N=C\diagup{}^{R_7}_{R_8}\right)$ |
|---|---|
| Glyoxylic acid | 1-carboxymethyleneamino- |
| α-Ketopropionic acid | 1-(α-carboxy)ethylideneamino- |
| α-Ketobutyric acid | 1-(α-carboxy)propylideneamino- |
| α-Ketovaleric acid | 1-(α-carboxy)butyrylideneamino- |
| α-Ketocaprylic acid | 1-(α-carboxy)heptylideneamino- |
| 3-ketobutyric acid | 1-(α-carboxymethyl)ethylideneamino- |
| 3-ketovaleric acid | 1-(α-carboxymethyl)propylideneamino- |
| 4-ketovaleric acid | 1-[α-(2-carboxyethyl)]-ethylideneamino- |
| Formylacetic acid | 1-carboxymethylmethyleneamino- |
| 3-formylpropionic acid | 1-(2-carboxyethyl)methyleneamino- |
| Mesoxylic acid | 1-dicarboxymethyleneamino- |
| Ketosuccinic acid | 1-(α,β-dicarboxy)ethylideneamino- |
| 2-ketoglutaric acid | 1-(α,γ-dicarboxy)propylideneamino- |
| 3-ketoglutaric acid | 1-(dicarboxymethyl)methyleneamino- |
| 3-ketoadipic acid | 1-(α-carboxymethyl-α-carboxy)propylideneamino- |
| 4-ketopimelic acid | 1-bis(β-carboxyethyl)methyleneamino- |
| 4-ketosuberic acid | 1-[α-(2-carboxyethyl)-α-carboxy]propylideneamino- |

Benzimidazoles of this invention wherein either $R_7$ or $R_8$ is loweralkonyl, the other being hydrogen, may be provided by treating the starting 1-amino benzimidazole with an α-ketoloweralkyl aldehyde such as, for example, α-ketopropionaldehyde, α-keto n-butylraldehyde, α-keto n-valeraldehyde and the like. Typical benzimidazoles prepared by employing such α-keto aldehydes as the reagent will include, for example, any of those benzimidazoles as described in Formula I above wherein the substituent at the 1-position

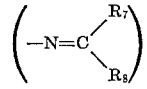

is illustrated in the following table:

TABLE IV

| Reagent | 1-substituent $\left(-N=C\diagup{}^{R_7}_{R_8}\right)$ |
|---|---|
| α-Keto propionaldehyde | 1-acetylmethyleneamino. |
| α-Keto n-butyraldehyde | 1-propionylmethyleneamino. |
| α-Keto n-valeraldehyde | 1-(n-butyryl)methyleneamino. |

Conveniently, the reactions employing an aldehyde or ketone as the reagent are carried out by treating a solution or suspension of the 1-amino benzimidazole in a solvent such as described above with the desired aldehyde or ketone at reflux. The time required for completion of the reaction will depend on the nature of the starting 1-aminobenzimidazole and the selected aldehyde or ketone reagent and may range from 1 to 72 hours. The crude product may be recovered by dilution of the reaction mixture and separation of the precipitate by filtration. Purification by conventional recrystallization techniques yields the desired product.

Although any of the benzimidazoles of Formula I may be prepared by the techniques described heretofore, it may be found convenient in preparing those compounds of this invention wherein the substituent at $R_5$ or $R_6$ is of the $R_1$-thiocarbonylamino type

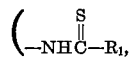

where $R_1$ is as defined in Formula I) to employ as the starting material a 1,5 (or 1,6)-diamino-$R_2$-benzimidazole ($R_2$ being as defined in Formula I). Applicants have found that the 1-amino-5- (or 6)-carbonylamino-$R_2$-benzimidazoles of Formula I (compounds wherein the substituent at $R_5$ or $R_6$ is of the type,

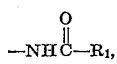

wherein $R_1$ is an defined in Formula I), which may be prepared by the techniques described above, when subjected to acid hydrolysis are readily converted into the corresponding 1,5 (or 1,6)-diamino compound. Hydrolysis may be carried out conveniently by treating the 1-amino-5 (or 6)-carbonylamino-$R_2$-benzimidazole starting material with concentrated hydrochloric acid at reflux temperature. The reaction usually is complete in from 4 to 24 hours and the product 1,5 (or 1,6)-diamino)-$R_2$-benzimidazole, obtained as the hydrochloride salt, is separated from the reaction mixture and basified in order to obtain the desired free diaminobenzimidazole.

Where the 1-amino-5 (or 6)-carbonylamino-$R_2$-benzimidazole starting material is of the type wherein $R_1$ is loweralkoxy, cycloloweralkoxy or aryloxy, hydrolysis to the corresponding 1,5- or 1,6-diaminobenzimidazole may be carried out alternatively by treating the starting material with concentrated sulfuric acid at room temperature. Hydrolysis is complete within 1 to 4 hours and the desired diaminobenzimidazole product may be obtained by diluting the reaction mixture with ice water followed by basification.

As indicated above, the 1,5 or 1,6-)-diamino-$R_2$-benzimidazoles prepared by the foregoing hydrolysis techniques, in addition to their physiological activity, serve as convenient intermediates for preparing those benzimidazoles of Formula I wherein the substituent at $R_5$ or $R_6$ is of the $R_1$-thiocarbonylamino type

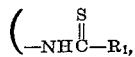

wherein $R_1$ is defined in Formula I). Applicants have found that the thiocarbonylamino grouping may be readily formed at the 5- or 6-position by treating the 1,5 (or 1,6)-diamino-$R_2$-benzimidazole starting material with a thiocarbonyl halide of the formula,

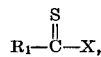

wherein $R_1$ is as defined in Formula I and X is a halogen, preferably chlorine or bromine. This reaction may be carried out by treating the 1,5 (or 1,6)-diaminobenzimidazole starting material with the desired $R_1$-thiocarbonyl halide at room temperature in a suitable organic solvent such as, for example, hexane, benzene, acetone, dichloromethane or the like. The reaction mixture is stirred at room temperature for about 1 to about 4 hrs. and the insoluble hydrohalide salt of the 1,5 (or 1,6)-diaminobenzimidazole starting material which has formed during the reaction is separated from the reaction mixture by filtration. Evaporation of the filtrate followed by conventional recrystallization yields the desired 1-amino-5 (or 6)-$R_1$-thiocarbonylamino-$R_2$-benzimidazole. Alternatively, and desirably, the above reaction can be carried out in an organic amine solvent such as pyridine thus eliminating the formation of the hydrohalide salt of the diaminobenzimidazole starting material.

As a further alternative which conveniently may be employed in the synthesis of benzimidazoles of Formula I having at the 5- or 6-position an $R_1$-thiocarboxylamino grouping, applicants have found that 1-amino-5(or 6)-aryloxy (preferably phenoxy) thiocarbonyl-amino-$R_2$-benzimidazoles, prepared as described above, undergo an ester interchange reaction when treated with a loweralkanol or cycloloweralkanol to form the corresponding 1-amino-5(or 6)-loweralkoxy (or cycloloweralkoxy) thiocarbonylamino-$R_2$-benzimidazole. This reaction may be carried out by refluxing the 1-amino-5-aryloxythiocarbonyl-amino-$R_2$-benzimidazole starting material with the lower-alkanol or cycloalkanol in the presence of a base such as alkali metal and alkaline earth metal hydroxide, carbonates and, preferably alkoxides. Reflux usually is continued for 12 to 24 hours and the product may be recovered by evaporation of the reaction mixture followed by conventional recrystallization.

Similarly, 1-amino-5(or 6)-aryloxythiocarbonyl-amino-$R_2$-benzimidazoles may be treated with ammonia, a mono- or diloweralkyl amine or with aniline, pyrrolidine, piperidine, morpholine or piperazine to prepare the corresponding 1 - amino-5-(or 6)-$R_2$-benzimidazole wherein the thiocarbonylamino substitutent at the 5- or 6-position is aminothiocarbonylamino, loweralkylaminothiocarbonylamino, diloweralkylaminothiocarbonylamino, anilinothiocarbonylamino, pyrrolidino, thiocarbonylamino, piperidinothiocarbonylamino, morpholinothiocarbonylamino and piperazinothiocarbonylamino, respectively. This reaction may be carried out at room temperature by treating the 1 - amino-5(or 6)-aryloxythiocarbonylamino-$R_2$-benzimidazole starting material with ammonia or with the desired amine in a suitable organic solvent such as acetone, benzene, dioxane, acetonitrile or the like. Usually 12 to 36 hours is required for completion of the reaction and the product is recovered by evaporation of the solvent followed by recrystallization of the residue.

It will be appreciated, of course, that any of the 1-amino - 5(or 6)-$R_1$-thiocarbonylamine-$R_2$-benzimidazoles described above may be employed *per se* as anthelmintic agents and as fungicides or, if desired, they may be subjected to further chemical treatment in order to convert the 1-amino group any of the substituted amino groupings illustrated in Formula I. The techniques required for such conversions already have been fully described above.

As noted above, the benzimidazoles of this invention will form addition salts with pharmaceutically acceptable acids. Also, those benzimidazoles of this invention wherein either or both of $R_7$ and $R_8$ are carboxy will form salts with alkali metals, alkaline earth metals and pharmaceutically acceptable amines. Many of these salts display greatly enhanced water solubility as compared with the parent benzimidazole and are highly useful in applications where water soluble formulations are desired. These salts may be formed by conventional techniques such as, for example, by contacting the parent benzimidazole with the desired acid or base followed by evaporation of the reaction mixture and conventional recovery and purification of the salt.

While all of the benzimidazoles of this invention display anthelmintic and fungicidal activity as disclosed above, it will be obvious of course that these compounds will display varying degrees of potency depending upon the nature of the particular application contemplated and the severity of the infestation to be combatted. In general, the preferred benzimidazoles of this invention are those wherein $R_3$ and $R_4$ are hydrogen and wherein $R_3$ and $R_4$ when taken together are

one of $R_7$ and $R_8$ being hydrogen and the other being carboxy and the alkali metal, alkaline earth metal and amine salts thereof, especially the diethanol amine salt. $R_2$, preferably, is thiazolyl and the preferred substituents at $R_5$ and/or $R_6$ are hydrogen and

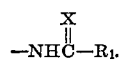

When X is oxygen, $R_1$, preferably is loweralkoxy, especially methoxy, ethoxy, and isopropoxy, phenyl or p-fluorophenyl. When X is sulfur, $R_1$ preferably is loweralkoxy, especially methoxy, phenyl or pyrrolidino.

When the benzimidazoles of this invention are employed for the treatment and control of helminthasis, the specific means employed for administering the benzimidazole to the animal is not critical and any of the methods now used or available for treating animals infected with, or susceptible to infection by helminths are satisfactory. Where it is desired to administer the benzimidazole in dry, solid unit dosage form, capsules, boluses or tablets containing the desired amount of benzimidazole usually are employed. These dosage forms are prepared intimately and uniformly mixing the active ingredient with suitable finely divided diluents, fillers, disintegrating agents and/or binders such as starch, lactose, talc, magnesium stearate, vegetable gums and the like. Such unit dosage formulations may be varied widely with respect to their total weight and content of anthelmintic agent depending upon factors such as the type of host animal to be treated, the severity and type of infection and the weight of the host. For large animals such as sheep, swine and cattle, unit dosages up to 15 gm., containing from 3 to 12 gm. of benzimidazole, may be employed. It is usually preferred however, to employ unit dosages weighing from 5 to 10 gm. containing from 2 to 8 gm. of benzimidazole. Boluses as well as smaller size tablets contain various binders and lubricants and are compounded by techniques well-known in the art. Capsules are prepared readily by mixing the active ingredient with a diluent such as starch or lactose and filling into the capsule.

In order to treat infected animals by means of a drench, the 1-ether and 1-ester benzimidazoles of this invention are mixed with a suspending agent such as bentonite and the solid mix is added to water just prior to administration. Alternatively, ready to use drench formulations, such as those described in U.S. Pat. No. 2,918,403, may be employed. Preferred drench formulations containing from about 5 to 50% by weight of the benzimidazole.

The benzimidazoles described herein also may be administered as a component of the feed of the animals or may be dissolved or suspended in the drinking water. Such compositions comprise the benzimidazole intimately dispersed in an inert carrier of diluent. By inert carrier, is meant one that will not react with the benzimidazole and one that may be administered safely to animals. Preferably, the carrier is one that it, or may be, an ingredient of the animal ration.

Suitable compositions include feed supplements in which the active ingredient is present in relatively large amounts and which are suitable for addition to the feed either directly or after an intermediate dilution or blending step. Typical carriers or diluents suitable for such compositions include, for example, distillers' dried grains, corn meal, citrus meal, fermentation residues, ground oyster shells, wheat shorts, molasses solubles, corn cob meal, edible bean mill feed, soya grits, crushed limestone and the like. The active benzimidazoles are intimately dispersed throughout the carrier by methods such as grinding, stirring, milling or tumbling. Compositions containing from about 5 to 50% by weight of the benzimidazole are particularly suitable as feed additives.

Examples of typical feed supplements containing the benzimidazoles of this invention dispersed in a solid carrier are:

(A)

|  | Lbs. |
|---|---|
| 1-Amino-2-(4'-thiazolyl)benzimidazole | 20 |
| Corn distiller's dried grains | 80 |

(B)

| | |
|---|---|
| 5-Isopropoxycarbonylamino - 1 - amino-2-(4'-thiazolyl)benzimidazole | 5 |
| Wheat standard middling | 95 |

(C)

| | |
|---|---|
| 5 - Methoxythiocarbonylamino - 1 - amino-2-(4'-thiazolyl)benzimidazole | 35 |
| Wheat shorts | 65 |

(D)

| | |
|---|---|
| 5-Benzamido - 1 - carboxymethyleneamino-2-(4'-thiazolyl)benzimidazole Diethanolamine salt | 50 |
| Corn distiller's grains | 50 |

These, and similar feed supplements, are prepared by uniformly mixing the benzimidazole with the carrier.

Such supplements are added to the animal feed in an amount to give the finished feed the concentration of benzimidazole desired for the treatment and control of helminthiasis. Although the desired concentration of active will vary depending upon the factors previously mentioned as well as upon the particular benzimidazole employed, the benzimidazoles of this invention are usually fed at concentrations of between 0.5 to 2.0% in the feed in order to achieve the desired anthelmintic result.

The benzimidazoles of this invention are effective fungicides in a variety of applications. Accordingly, they may be employed as fungicides by conventional techniques in the protection of plants, soils, fruits, seeds, fur, wood, paint, textiles, cosmetics, leather, tobacco, rope, paper, pulp, plastic, fuel, rubber, food and the like.

It should be understood that the benzimidazole compounds may be utilized in diverse formulations, solid, including finely divided powders and graunlar materials as well as liquid, such as solutions, emulsions, suspensions, concentrates, emulsifiable concentrate, slurries and the like, depending upon the application intended and the formulation media desired. Thus, it will be appreciated that benzimidazoles of this invention may be employed to form fungicidally active compositions containing such compounds as essentially active ingredients thereof, which compositions may also include finely divided dry or liquid diluents, extenders, fillers, conditioners and excipients, including various clays, diatomaceous earth, talc, and the like, or water and various organic liquids such as lower alkanols, for example ethanol and isopropanol, or kerosene, benzene, toluene and other petroleum distillate fractions or mixtures thereof. The quantity of active benzimidazole contained in such formulations will vary widely depending upon the particular benzimidazole employed and the particular application intended. In general, useful formulations will contain from about 1 to about 95% of the active benzimidazole.

It should be understood also that the benzimidazoles of the invention may be used in combination one with the other as well as with other fungicidally active materials. For instance, the benzimidazoles disclosed above may be mixed with sorbic acid or its salts, propionic acid or its salts, mycostatin, sodium diacetate, trichomycin, amphotercin, griseofluvin, undecylenic acid, chloroquinadol, 5,7-dichloro-8-hydroxyquinoline (Vioform), sodium o-phenylphenate, o-phenylphenol, biphenyl, chlorinated phenols, sodium benzoate, dehydroacetic acid and its salts or esters of parahydroxybenzoic acid, such as the methyl and propyl ester (parabens) to give added fungicidal effect when used in appropriate concentrations. It is quite clear, too, that the benzimidazoles of this invention may be used in conjunction with effective anti-bacterial materials in appropriate instances so as to combine the action of each in such a situation as to be particularly useful, for instance, in applications where the presence of bacteria creates undesirable results alongside the detrimental action of fungi. Accordingly, a combination of antifungal and antibacterial agents will be useful in the preparation of germicidal soaps, in the production of cosmetics, and in food, such as beer, cheese, or meat and other leather applications.

It has been found that growth of various fungi existing in soil is limited or terminated by the addition to the soil of minor quantities of the benzimidazole compounds described. The term soil as used herein is intended to include all media capable of supporting the growth of plants and may include humus, sand, manure, compost, artificially created plant growth solution, and the like. It has been found also that the benzimidazoles of the invention are effective against fungal diseases of plants and may be effectively used either by direct contact with the foliage or systemically, by introduction through the roots.

The compounds of this invention also have activity against bacteria and plant nematodes and may, at appropriate levels of concentration, be effectively used to inhibit or prevent the growth of these organisms.

As fungicides, the benzimidazoles of the present invention are useful in inhibiting mold growth in fruit such as citrus fruit. The active agent may be applied at any time before consumption and preferably after harvesting. For instance the antifungal may be applied during initial storage, before or after shipping or during final storage before consumption. The benzimidazoles may be utilized in a number of ways in this regard and may be applied either directly to the fruit in an emulsion, solution, suspension or the like or it may be applied to the fruit container or wrapper. Suitable carriers for the active agents are waxes and other materials presently known in the art The best mode contemplated by applicants for carrying out their invention is set forth in the following examples; it being understood that these examples are for purposes of illustration merely and no limitation is intended except as set forth in the appended claims.

EXAMPLE 1

1-Amino-2-(4'-Thiazolyl)Benzimidazole

To a stirred suspension of 100.5 g. of 2-(4'-thiazolyl)benzimidazole in 2 liters of ethanol is added 700 ml. of 2.6 M aqueous sodium hydroxide. To the resulting solution is added 100 g. of hydroxylamine-o-sulfonic acid in portions so as to maintain the reaction temperature between 40 and 50%. A further 300 ml. of 2.6 M aqueous sodium hydroxide solution is added and 50 g. of hydroxylamine-o-sulfonic acid as previously. The mixture is stirred for 3 days at room temperature and then most of the ethanol evaporated. Addition of water precipitates the product which is collected and washed with water. Crystallization from benzene/ethanol gives 1-amino-2-(4'-thiazolyl)benzimidazole (m.p. 53–155° C.).

EXAMPLE 2

1-Amino-5(or 6)-Isopropoxycarbonylamino-2-(4'-Thiazolyl)Benzimidazole

To a stirred suspension of 21.6 g. of 5-isopropoxycarbonylamino-2-(4'-thiazolyl)benzimidazole in 500 ml. of ethanol is added a solution of 20 g. of sodium hydroxide in 300 ml. of water. To the resulting solution is added in portions 28.8 g. of hydroxylamine-o-sulfonic acid. After stirring the mixture for 20 hours at room temperature the additions of sodium hydroxide solution and hydroxylamine-o-sulfonic acid are repeated in the same way. After stirring for a further 4 hours the mixture of 1-amino - 5 - isopropoxy-carbonylamino-2-(4'-thiazolyl)benzimidazole and 1-amino-6-isopropoxycarbonylamino-2-(4'-thiazolyl)benzimidazole is precipitated by the addition of 1.2 liters of ice water, filtered off and washed with water. Separation of the isomers is achieved by fractional crystallization. 1 - Amino-5-isopropoxycarbonylamino-2-(4'-thiazolyl)benzimidazole crystallizes from ethyl acetate (m.p. 192–193° C.). 1-Amino-6-isopropoxycarbonylamino-2-(4'-thiazolyl)benzimidazole crystallizes from benzene (m.p. 199–201° C.).

EXAMPLE 3

1-Amino-5(or 6)-Benzamido-2-(4'-Thiazolyl)Benzimidazole

To a stirred suspension of 9.6 g. of 5-benzamido-2-(4'-thiazolyl)benzimidazole in 95 ml. of dimethylsulfoxide is added 50 ml. of 2.6 N aqueous sodium hydroxide, followed by 7.5 g. of hydroxylamine-o-sulfonic acid in portions so as to maintain the temperature at approximately 60° C. After 1 hour a further portion of 25 ml. of 2.6 N aqueous sodium hydroxide is added, followed by 4.9 g. of hydroxylamine-o-sulfonic acid. The mixture is stirred for 20 hours at room temperature and then diluted with 1.2 liters of ice water to precipitate the product which is a mixture of 1-amino-5-benzamido-2-(4'-thiazolyl)benzimidazole and 1-amino-6-benzamido-2-(4'-thiazolyl)benzimidazole. Separation of the isomers is achieved by fractional crystallization from a mixture of 2 parts of methanol and 1 part of methylene chloride to yield 1-amino-5-benzamido-2-(4'-thiazolyl)benzimidazole (m.p. 193–194° C.) and 1-amino-6-benzamido-2-(4'-thiazolyl)benzimidazole (m.p. 226–228° C.).

EXAMPLE 4

1-Amino-2-Methoxycarbonylaminobenzimidazole

To a stirred suspension of 19.1 g. of 2-methoxycarbonylaminobenzimidazole in 200 ml. of dimethylformamide is added 27.5 ml. of 50% aqueous sodium hydroxide, followed by 30 g. of hydroxylamine-o-sulfonic acid in portions so as to maintain the reaction temperature between 40° C. and 50° C. The mixture is stirred for 1 day at room temperature then diluted with water to precipitate 1 - amino-2-methoxycarbonylaminobenzimidazole which is collected and washed with water.

EXAMPLE 5

1,2-Diaminobenzimidazole

To a stirred solution of 13.3 g. of 2-aminobenzimidazole and 100 ml. of 2.6 N NaOH in 40 ml. of water is added 15 g. of hydroxylamine-o-sulfonic acid. After 1 hour a second 100 ml. portion of 2.6 N NaOH is added, followed by 15 g. of hydroxylamine-o-sulfonic acid. The mixture is stirred at room temperature for 22 hours and then the product is filtered off and washed with water. Crystallization from ethanol gives 1,2-diaminobenzimidazole (m.p. 260–262° C.).

As indicated in the foregoing specification any of the 1-aminobenzimidazoles of this invention (e.g. those compounds of Formula I wherein $R_3$ and $R_4$ are hydrogen) may be prepared by direct ammination of the parent 1-desamino benzimidazole employing the techniques described in Examples 1–5. The starting 1-desamino benzimidazole, of course, may be unsubstituted or may bear any of the $R_2$, $R_5$ and $R_6$ substituents as described above.

EXAMPLE 6

5-Isopropoxycarbonylamino-1-Methylamino-2-(4'-Thiazolyl)Benzimidazole

A suspension of 3.17 g. of 5-isopropoxycarbonylamino-2-(4'-thiazolyl)benzimidazole, 0.69 g. of potassium carbonate and 1.42 g. of methyliodide in 100 ml. of acetone is stirred for 4 days at room temperature. The solvent is evaporated and the residue washed with water to obtain 5 - isopropoxycarbonylamino-1-methylamino-2-(4'-thiazolyl)benzimidazole.

EXAMPLE 7

1-Dimethylamino-5-Isopropoxycarbonylamino-2-(4'-Thiazolyl)Benzimidazole

A suspension of 3.31 g. of 1-methylamino-5-isopropoxycarbonylamino-2-(4'-thiazolyl)benzimidazole, 0.69 g. of potassium carbonate and 1.42 g. of methyliodide in 100 ml. of acetone is stirred for 4 days at room temperature. The solvent is evaporated and the residue is washed with water to obtain 1-dimethylamino-5-isopropoxycarbonylamino-2-(4'-thiazolyl)benzimidazole.

By substituting in Examples 6 and 7 an equivalent quantity of a benzyl halide (e.g., benzyl chloride for example) for the methyl iodide, 5-isopropoxycarbonylamino-1-benzylamino-2-(4' - thiazolyl)benzimidazole and 1 - dibenzylamino - 5 - isopropoxycarbonylamino-2-(4'-thiazolyl)benzimidazole may be prepared.

EXAMPLE 8

1-Trifluoroacetylamino-2-(4'-Thiazolyl)Benzimidazole

To a suspension of 2.01 g. of 2-(4'-thiazolyl)benzimidazole in 10 ml. of pyridine is added 2.1 g. of trifluoroacetic anhydride. The mixture is stirred at room temperature for 2 hours and then the product is precipitated by dilution with ice water. Crystallization from methanol gives 1 - trifluoroacetylamino-2-(4'-thiazolyl)benzimidazole (m.p. 279–280° C.).

EXAMPLE 9

1-Succinylamino-2-(4'-Thiazolyl)Benzimidazole

A mixture of 6.6 g. of 2-(4'-thiazolyl)benzimidazole and 3.3 g. of succinic anhydride in 200 ml. of methylene chloride is refluxed for 3 days. The precipitated product is collected and crystallized from a mixture of methanol and either to yield pure 1-succinylamino-2-(4'-thiazolyl)-benzimidazole (m.p. 203–204° C.).

EXAMPLE 10

1-Acetylamino-5-Isopropoxycarbonylamino-2-(4'-Thiazolyl)benzimidazole

A mixture of 3.17 g. of 1-amino-5-isopropoxycarbonylamino-2-(4'-thiazolyl)benzimidazole and 0.8 g. of acetyl chloride in 20 ml. of pyridine was stirred for 2 hours at room temperature. Addition of 100 ml. of ice water precipitates 1-acetylamino - 5 - isopropoxycarbonylamino-2-(4'-thiazolyl)benzimidazole.

EXAMPLE 11

1-Benzylideneamino-2-(4'-Thiazolyl)Benzimidazole

A mixture of 6.5 g. of 1-amino-2-(4'-thiazolyl)benzimidazole, 3.50 g. of benzaldehyde and 4 ml. of acetic acid in 150 ml. of benzene, is refluxed for three days, collecting the entrained water in a water trap. Dilution of the reaction mixture with petroleum benzin yields 1-benzylideneamino-2-(4'-thiazolyl)benzimidazole (m.p. 134° C.).

By substituting in the process of Example 11 an equivalent quantity of any desired aldehyde and/or substituting an equivalent quantity of any desired 1-aminobenzimidazole for the benzaldehyde and/or the 1-amino-2-(4'-thiazolyl)benzimidazole employed in Example 11, there may be prepared any of those benzimidazoles of this invention wherein the substituent at the 1-position is of the type,

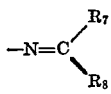

(note that use of a loweralkyl aldehyde or benzaldehyde as the reagent results in the preparation of compounds wherein $R_7$ or $R_8$, but not both, are loweralkyl or phenyl). Typical reagents and products are illustrated in Table I, above.

Similarly, by substituting in the process of Example 11 an equivalent quantity of any desired ketone and/or substituting an equivalent quantity of any desired 1-aminobenzimidazole for the benzaldehyde and/or the 1-amino-2-(4'-thiazolyl)benzimidazole employed in Example 11, there may be prepared any of those benzimidazoles of this invention wherein both $R_7$ and $R_8$ are loweralkyl or phenyl. Table II, above, illustrates typical reagents and products.

EXAMPLE 12

1-Carboxymethyleneamino-5-Isopropoxycarbonylamino-2-(4'-Thiazolyl)Benzimidazole

A mixture of 32 g. of 1-amino-5-isopropoxycarbonylamino-2-(4'-thiazolyl)benzimidazole and 21 g. of glyoxylic acid hydrate, in 650 ml. of isopropanol is refluxed for 1½ hours. The product crystallizes from the cooled reaction mixture (m.p. 176° C.).

By substituting in the process of Example 12 an equivalent quantity of 1-amino-6-isopropoxycarbonylamino-2-(4'-thiazolyl)benzimidazole, 1-amino - 2 - (4'-thiazolyl)benzimidazole, 1-amino-5-benzamido - 2 - (4'-thiazolyl)benzimidazole or 1 - amino-6-benzamido-2-(4'-thiazolyl)benzimidazole for the 1-amino - 5 - isopropoxycarbonylamino-2-(4'-thiazolyl)benzimidazole, there may be prepared 1 - carboxymethyleneamino-6-isopropoxycarbonylamino-2-(4'-thiazolyl)benzimidazole (m.p. 199° C.), 1-carboxymethyleneamino - 2 - (4'-thiazolyl)benzimidazole (m.p. 170–172° C.), 5-benzamido-1-carboxymethyleneamino-2-(4'-thiazolyl)benzimidazole (m.p. 160° C.) and 6 - benzamido-1-carboxymethyleneamino-2-(4'-thiazolyl)benzimidazole (m.p. 191–192° C.), respectively.

EXAMPLE 13

1-[α-(2-Carboxyethyl)-α-Carboxyl]-Propylideneamino-5-Benzamido-2-(4'-Thiazolyl)Benzimidazole

A mixture of 1.68 g. of 1-amino-5-benzamido-2-(4'-thiazolyl)benzimidazole, 0.87 g. of 4-ketopimelic acid and 2 ml. of acetic acid in 55 ml. of benzene is refluxed for 1 day, collecting the entrained water in a water trap. The product precipitates on cooling (m.p. 296–297° C.).

EXAMPLE 14

1-(α-γ-Dicarboxy)Propylideneamino-5-Benzamido-2-(4'-Thiazolyl)Benzimidazole

Mix 1.68 g. of 1-amino-5-benzamido-2-(4'-thiazolyl)benzimidazole, 0.73 g. of 2-ketoglutaric acid and 2 ml. of acetic acid in 55 ml. of benzene. Reflux for 24 hours, collecting the entrained water in a water trap. Cool the reaction mixture and separate the product by filtration (m.p. 110° C.).

By substituting in the process of Examples 12, 13 or 14 an equivalent quantity of any desired keto mono- or dicarboxylic acid and/or substituting an equivalent quantity of any desired 1-aminobenzimidazole for the keto acids and/or benzimidazoles employed in these examples, there may be prepared any of those benzimidazoles of this invention where either or both of $R_7$ and $R_8$ are carboxy or carboxyloweralkyl. Typical reagents and products are illustrated in Table III, above. Similarly, substitution of an α-ketoloweralkylaldehyde for the keto acid employed in these examples results in the preparation of those benzimidazoles of this invention wherein $R_7$ or R is loweralkanoyl. Table IV above illustrates typical reagents and products.

EXAMPLE 15

1-5-Diamino-2-(4'-Thiazolyl)Benzimidazole

10 g. of 1-amino - 5 - isopropoxycarbonylamino-2-(4'-thiazolyl)benzimidazole is added to 20 ml. of concentrated sulfuric acid with stirring. After 1 hour the reaction is diluted with ice and basified with ammonia to yield the product (m.p. 200–202° C.).

EXAMPLE 16

1,5-Diamino-2-(4'-Thiazolyl)Benzimidazole

A suspension of 71 g. of 1-amino-5-benzamido-2(4'-thiazolyl)benzimidazole in 600 ml. of concentrated hydrochloric acid and 400 ml. of water is refluxed for 7 hours. The solution is cooled, the hydrochloride salt is filtered off, suspended in water and basified with ammonia to yield the product (m.p. 200–202° C.).

EXAMPLE 17

1,6-Diamino-2-(4'-Thiazolyl)Benzimidazole

Repeat the process of Example 15, substituting 1-amino-6-isopropoxycarbonylamino - 2 - (4'-thiazolyl)-benzimidazole for the 1-amino-5-isopropoxycarbonylamino-2-(4'-thiazolylbenzimidazole, to obtain 1,6-diamino-2-(4'-thiazolyl)benzimidazole (m.p. 230–234° C.).

EXAMPLE 18

1,6-Diamino-2-(4'-Thiazolyl)Benzimidazole

Repeat the process of Example 16, substituting 1-amino-6-benzamido-(4'-thiazolyl)benzimidazole for the 1-amino-5-benzamido-2-(4'-thiazolyl)benzimidazole and refluxing for 18 hours, to obtain 1,6-diamino-2-(4'-thiazolyl)benzimidazole (m.p. 230–234° C.).

EXAMPLE 19

1-Amino-5-Methoxythiocarbonylamino-2-(4'-Thiazolyl)Benzimidazole

A solution of 3.87 g. of methoxythiocarbonyl chloride in 70 ml. of dichloromethane is added dropwise to a stirred suspension of 7.93 g. of 1,5-diamino-2-(4'-thiazolyl)benzimidazole in 250 ml. of dichloromethane. The solution is stirred for a further 1¼ hours at room temperature, the insoluble hydrochloride salt of 1,5-diamino-2-(4'-thiazolyl)benzimidazole is filtered off and the product is obtained by evaporation of the filtrate. Crystallization from methanol gives 1-amino-5-methoxythiocarbonylamino-2-(4'-thiazolyl)benzimidazole (m.p. 200–201° C.).

EXAMPLE 20

1-Amino-6-Methoxythiocarbonylamino-2-(4'-Thiazolyl)Benzimidazole

Repeat the process of Example 19, substituting 1,6-diamino-2-(4'-thiazolyl)benzimidazole for the 1,5-isomer, to obtain 1-amino-6-methoxythiocarbonylamino-2-(4'-thiazolyl)benzimidazole.

EXAMPLE 21

1-Amino-5-Phenoxythiocarbonylamino-2-(4'-Thiazolyl)Benzimidazole

Repeat the process of Example 19, using 1.617 g. of 1,5-diamino-2-(4'-thiazolyl)-benzimidazole and 1.21 g. of phenylthiocarbonyl chloride instead of methylthiocarbonyl chloride. Crystallize from dichloromethane to obtain 1-amino - 5 - phenoxythiocarbonylamino - 2 - (4'-thiazolyl) (benzimidazole (m.p. 174–175° C.).

EXAMPLE 22

1-Amino-5-Phenoxythiocarbonylamino-2-(4'-Thiazolyl)Benzimidazole 0.86 g. of Phenoxythiocarbonyl chloride is added dropwise to a stirred solution of 1.15 g. of 1,5-diamino-2-(4'-thiazolyl)benzimidazole in 15 ml. of pyridine. After 1 hour the solution is diluted with ice water, the product is filtered off and crystallized from dichloromethane (m.p. 174–175° C.).

EXAMPLE 23

1-Amino-5-Methoxythiocarbonylamino-2-(4'-Thiazolyl)Benzimidazole

A solution of 3.6 g. of 1-amino-5-phenoxythiocarbonylamino-2-(4'-thiazolyl)benzimidazole and 20 mg. of sodium methoxide in 300 ml. of methanol is refluxed for 24 hours. Evaporation of the solvent and crystallization of the residue from methanol yields the product (m.p. 200–201° C.).

EXAMPLE 24

1-Amino-6-phenoxythiocarbonylamino-2-(4'-Thiazolyl)Benzimidazole

Repeat the process of Example 21 or Example 22 substituting 1,6-diamino-2-(4'-thiazolyl)benzimidazole for the 1,5-diamino isomer, to obtain 1-amino-6-phenoxythiocarbonylamino-2-(4'-thiazolyl)benzimidazole.

EXAMPLE 25

1-Amino-5-Cyclobutylenethioureido-2-(4'-Thiazolyl)Benzimidazole

A mixture of 100 mg. of 1-amino-5-phenoxythiocarbonylamino-2-(4'-thiazolyl)benzimidazole and 102 mg. of pyrrolidine in 9 ml. of acetonitrile is allowed to stand for 24 hours at room temperature. A small amount of solid is filtered off, the solvent is evaporated and the residue is triturated with ether to yield the product (m.p. 209–210° C.).

EXAMPLE 26

1-Amino-6-Cyclobutylenethioureido-2-(4'-Thiazolyl)Benzimidazole

Repeat the process of Example 25, substituting 1-amino-6-phenoxythiocarbonylamino - 2 - (4'-thiazolyl)benzimidazole for the 1-amino-5-phenoxythiocarbonylaminoisomer to obtain 1-amino-6-cyclobutylenethioureido-2-(4'-thiazolyl)benzimidazole.

EXAMPLE 27

1-Carboxymethyleneamino-5-Methoxythiocarbonylamino-2-(4'-Thiazolyl)Benzimidazole A mixture of 1.14 g. of 1-amino-5-methoxythiocarbonylamino-2-(4'-thiazolyl)benzimidazole and 0.666 g. of glyoxylic acid hydrate in 25 ml. of ethanol is refluxed for 1 hour. Addition of ether precipitates the product (m.p. 195–197° C.).

By employing as the starting benzimidazole in the process of Example 27 1-amino-6-methoxythiocarbonylamino-2-(4'-thiazolyl)benzimidazole, 1-amino - 5 - cyclobutylenethioureido - 2 - (4'-thiazolyl)benzimidazole or 1-amino-6-cyclobutylenethioureido - 2 - (4'-thiazolyl)benzimidazole, there may be prepared 1 - carboxymethyleneaminn-6-methoxythiocarbonylamino - 2 - (4' - thiazolyl)benzimidazole, 1 - carboxymethyleneamino - 5 - cyclobutylenethioureido - 2 - (4' - thiazolyl)benzimidazole (m.p. 172–174° C.) and 1 - carboxymethyleneamino-6-cyclobutylenethioureido - 2 - (4'-thiazolyl)benzimidazole, respectively.

EXAMPLE 28

1-Carboxymethyleneamino-5-Methoxythiocarbonylamino-2-(4'-Thiazolyl)Benzimidazole Diethanolamine Salt To a suspension of 6.4 g. of 1-carboxymethyleneamino-5-methoxythiocarbonylamino - 2 - (4' - thiazolyl)benzimidazole in 50 ml. of methanol is added 19.6 ml. of solution containing 2.10 g. of diethanolamine made up to 20 ml. with methanol. After a clear solution is obtained the product is precipitated by the addition of 100 ml. of isopropanol (m.p.146–147° C., decomp.).

EXAMPLE 29

1-Carboxymethyleneamino-5-Methoxythiocarbonylamino-2-(4'-Thiazolyl)Benzimidazole Triethanolamine Salt Repeat the process of Example 28, substituting an equivalent quantity of triethanolamine for the diethanolamino, to obtain 1-carboxymethyleneamino-5-methoxythiocarbonylamino - 2 - (4'-thiazolyl)benzimidazole triethanolamine salt (m.p. 60° C. decomp.).

EXAMPLE 30

1-Carboxymethyleneamino-5-Isopropoxycarbonylamino-2-(4'-Thiazolyl)Benzimidazole Diethanolamine Salt To a solution of 4.05 g. of diethanolamine in 85 ml. of methanol is added 12 g. of 1-carboxymethyleneamino-5-isopropoxycarbonylamino-2-(4' - thiazolyl)benzimidazole. After a solution is obtained, the salt is precipitated by the addition of ether (m.p. 136° C.).

Following the procedure of Example 30 and substituting 1 - carboxymethyleneamino - 2 - (4' - thiazolyl)-benzimidazole, 1 - carboxymethyleneamino-5-benzamido-2 - (4' - thiazolyl)benzimidazole or 1 - carboxymethyleneamino-6-benzamido - 2 - (4' - thiazolyl)benzimidazole for the 1 - carboxymethyleneamino - 5 - isopropoxycarbonylamino - 2 - (4' - thiazolyl)benzimidazole employed in the example, there may be prepared 1 - carboxymethyleneamino-2-(4'-thiazolyl)benzimidazole diethanolamine salt (m.p. 140–141° C.), 1 - carboxymethyleneamino - 5-benzamido - 2 - (4' - thiazolyl)benzimidazole diethanolamine salt (m.p. 173° C.) and 1-carboxymethyleneamino-6-benzamido - 3 - (4' - thiazolyl)benzimidazole diethanolamine salt (m.p. 220–222° C.), respectively.

EXAMPLE 31

1-Carboxymethyleneamino-5-Isopropoxycarbonylamino-2-(4'-Thiazolyl)Benzimidazole Sodium Salt To a suspension of 3.73 g. of 1-carboxymethyleneamino - 5 - isopropoxycarbonylamino - 2 - (4'-thiazolyl) benzimidazole in 20 ml. of methanol is added a solution of 0.54 g. of sodium methoxide in 10 ml. of methanol. After a solution is formed the salt is precipitated by the addition of ether.

EXAMPLE 32

1-Amino-5-Isopropoxycarbonylamino-2-(4'-Thiazolyl) Benzimidazole Hydrochloride

To a suspension of 3.20 g. of 1-amino-5-isopropoxycarbonylamino-2-(4'-thiazolyl)benzimidazole in 20 ml. of methanol is added a mixture of 10 ml. of 1 N hydrochloric acid in 10 ml. of methanol. The reaction mixture is stirred for 1 hour at room temperature and the salt is precipitated by the addition of ether.

The subject matter which applicants regard as their invention is particularly pointed out and distinctly claimed as follows.

1. A compound having the formula:

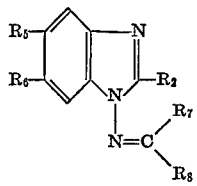

wherein $R_2$ is thiazolyl; one of $R_7$ and $R_8$ is hydrogen and the other is carboxy and the alkali metal, alkaline earth metal, and the ammonia, ethanolamine, diethanolamine, guanidine, arginine, lysine, ethylenediamine, piperazine, and morpholine salts thereof; and $R_5$ and $R_6$ are hydrogen or:

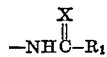

such that when x is oxygen, $R_1$ is loweralkoxy or phenyl; and when x is sulfur, $R_1$ is loweralkoxy, phenyl or pyrrolidino.

2. A compound of claim 1 wherein one of $R_5$ and $R_6$ is hydrogen and the other is loweralkoxycarbonylamino.

3. A compound of claim 1 wherein the salt of the carboxylic acid group is the diethanolamine salt.

4. The compound of claim 1 which is 1-carboxymethyleneamino-2-(4'-thiazolyl)benzimidazole.

5. The compound of claim 1 which is 1-carboxymethyleneamino - 5(6) - isopropoxycarbonylamino - 2 - (4'-thiazolyl)benzimidazole.

6. The compound of claim 1 which is 1-carboxymethyleneamino - 5(6) - isopropoxycarbonylamino - 2 - (4'-thiazolyl)benzimidazole diethanolamine salt.

7. The compound of claim 1 which is 1-carboxymethyleneamino - 5(6) - benzamido - 2 - (4' - thiazolyl)benzimidazole.

8. The compound of claim 1 which is 1-carboxymethyleneamino - 5(6) - p - fluorobenzamido - 2 - (4'-thiazolyl)-benzimidazole.

9. The compound of claim 1 which is 1-carboxymethyleneamino - 5(6) - phenylthiocarbonylamino - 2 - (4'-thiazolyl)benzimidazole.

10. The compound of claim 1 which is 1-carboxymethyleneamino - 5(6) - methoxythiocarbonylamino - 2 - (4'-thiazolyl)benzimidazole.

11. The compound of claim 1 which is 1-carboxymethyleneamino - 5(6) - methoxythiocarbonylamino-2-(4'-thiazolyl)benzimidazole diethanolamine salt.

12. The compound of claim 1 which is 1-carboxymethyleneamino - 5(6) - methoxythiocarbonylamino - 2(4'-thiazolyl)benzimidazole triethanolamine salt.

13. The compound of claim 1 which is 1 - carboxymethyleneamino - 5(6) - cyclobutylenethioureido - 2 - (4'-thiazolyl)benzimidazole.

References Cited

UNITED STATES PATENTS

| | | | |
|---|---|---|---|
| 3,183,239 | 5/1965 | Brown | 260—302 H |
| 3,398,157 | 8/1968 | Chemerda et al. | 260—302 H |
| 3,429,890 | 2/1969 | Sletzinger et al. | 260—302 H |
| 3,478,046 | 11/1969 | Sarett et al. | 260—302 H |
| 3,646,049 | 2/1972 | Hoff et al. | 260—302 H |
| 3,686,110 | 8/1972 | Fisher et al. | 260—302 H |

RICHARD J. GALLAGHER, Primary Examiner

U.S. Cl. X.R.

99—2, 48, 156, 159, 161, 162; 252—8, 57, 106; 260—240 G, 247.1, 268 R, 299, 309.2; 424—245, 248, 250, 270, 273